(12) United States Patent
Takebe et al.

(10) Patent No.: US 11,084,125 B2
(45) Date of Patent: Aug. 10, 2021

(54) LASER WELDING METHOD FOR WELDING OVERLAPPED PLURAL WELDING WORKPIECES

(71) Applicant: H-ONE CO., LTD., Saitama (JP)

(72) Inventors: Hiroyuki Takebe, Saitama (JP); Fumihiko Sugihara, Saitama (JP)

(73) Assignee: H-ONE CO., LTD., Saitama (JP)

( * ) Notice: Subject to any disclaimer, the term of this patent is extended or adjusted under 35 U.S.C. 154(b) by 386 days.

(21) Appl. No.: 15/568,141

(22) PCT Filed: Jan. 11, 2017

(86) PCT No.: PCT/JP2017/000635
§ 371 (c)(1),
(2) Date: Oct. 20, 2017

(87) PCT Pub. No.: WO2017/122681
PCT Pub. Date: Jul. 20, 2017

(65) Prior Publication Data
US 2018/0079031 A1    Mar. 22, 2018

(30) Foreign Application Priority Data
Jan. 12, 2016    (JP) .............................. JP2016-003251

(51) Int. Cl.
*B23K 26/244*    (2014.01)
*B23K 26/082*    (2014.01)
(Continued)

(52) U.S. Cl.
CPC ........ *B23K 26/244* (2015.10); *B23K 26/0665* (2013.01); *B23K 26/082* (2015.10); *B23K 26/28* (2013.01)

(58) Field of Classification Search
CPC ............................ B23K 26/082; B23K 26/244
See application file for complete search history.

(56) References Cited

U.S. PATENT DOCUMENTS

| 4,015,100 A | * | 3/1977 | Gnanamuthu | ......... B23K 26/34 148/512 |
| 2004/0182836 A1 | * | 9/2004 | Becker | ................... B23K 26/24 219/121.64 |

(Continued)

FOREIGN PATENT DOCUMENTS

| JP | 2007-313544 | 12/2007 |
| JP | 2012-170989 | 9/2012 |
| JP | 2012-228715 | 11/2012 |

OTHER PUBLICATIONS

International Search Report dated Feb. 7, 2017 filed in PCT/JP2017/000635.

(Continued)

*Primary Examiner* — Erin E McGrath
(74) *Attorney, Agent, or Firm* — Rankin, Hill & Clark LLP

(57) ABSTRACT

A laser lap welding method is provided. The laser lap welding method includes linearly scanning one side surface of overlapped plural workpieces with a laser beam in a linear scanning range of from a welding start point of the one side surface to a welding end point thereof to weld the plural workpieces; controlling a power of the laser beam to gradually decrease until the laser beam reaches the welding end point when the laser beam reaches a laser power control point in the linear scanning range a predetermined time before the laser beam reaches the welding end point; and performing circular laser scanning using the laser beam around an axis extending in a depth direction of the plural workpieces through the welding end point after the laser beam reaches the welding end point to circularly melt and fluidize a portion of the plural workpieces around the welding end point.

3 Claims, 9 Drawing Sheets

(51) Int. Cl.
*B23K 26/06* (2014.01)
*B23K 26/28* (2014.01)

(56) References Cited

U.S. PATENT DOCUMENTS

| | | |
|---|---|---|
| 2008/0223831 A1* | 9/2008 | Yoshikawa .......... B23K 26/082 219/121.63 |
| 2012/0211474 A1 | 8/2012 | Hayashimoto et al. |
| 2014/0048518 A1 | 2/2014 | Ogura et al. |

OTHER PUBLICATIONS

Notification of Reasons for Refusal dated Apr. 18, 2017 for the corresponding Japanese Patent Application No. 2016-003251 and its English machine translation.

\* cited by examiner

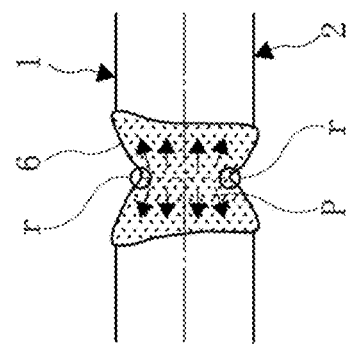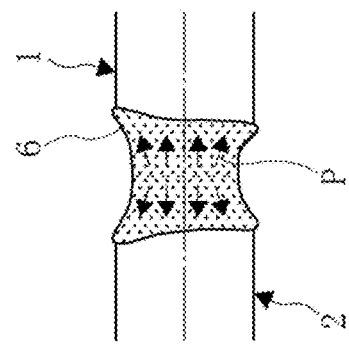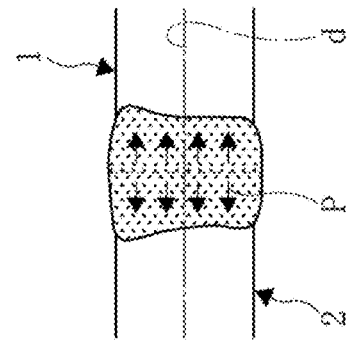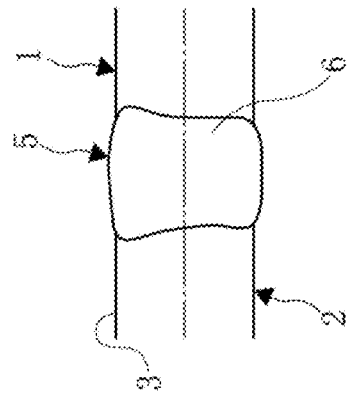

SOLIDIFICATION CRACK (EXTERNAL CRACK)

SOLIDIFICATION CRACK (INTERNAL CRACK)

LASER WELDING METHOD FOR WELDING OVERLAPPED PLURAL WELDING WORKPIECES

BACKGROUND

Technical Field

This disclosure relates to a laser welding method for welding overlapped plural welding workpieces, and particularly relates to a laser welding method for welding overlapped plural welding workpieces by scanning a welding scanning region of from a welding start point to a welding end point on one side surface of the welding workpieces with a laser beam.

Description of the Related Art

In general, such a laser welding method as mentioned above (hereinafter sometimes referred to as a laser lap welding method) is performed as illustrated in FIG. 7. Referring to FIG. 7, one side surface 3 of overlapped two workpieces (i.e., steel plates) 1 and 2 is linearly irradiated (scanned) with a laser beam L using a laser head 4 in a direction X of from a welding start point S to a welding end point E, thereby locally melting the metal of the workpiece 1 (i.e., forming a melted metal 5a). The melted metal 5a adheres to the workpiece 2 through a gap d between the two workpieces 1 and 2 and then solidifies, resulting in welding of the two workpieces 1 and 2.

In this case, as illustrated in FIG. 7, a diameter ΦA of the laser beam L with which the side surface 3 is irradiated is maintained to be substantially the same in the range of from the welding start point S to the welding end point E to keep the laser power constant, wherein the diameter is set to the minimum diameter (i.e., the diameter in the focused state in which the laser beam has the maximum energy density) to enhance the laser power efficiency.

However, when the laser power is maintained in the predetermined range of from the welding start point S to the welding end point E in such a conventional laser lap welding method, a sink 6 is formed on the side surface 3 of the welding end point E as illustrated in FIG. 8, thereby decreasing the joint strength of the workpieces 1 and 2. The reason why the sink 6 is formed at the welding end point E of the workpieces 1 and 2 is considered as follows. Specifically, the melted metal 5a formed by continuously irradiating the workpieces 1 and 2 locally with the laser beam L is pushed in the scanning direction X (i.e., in the direction toward the sink 6) when the laser welding processing is performed, and the melted metal 5a pushed to the sink 6 sequentially solidifies from the outer part thereof. In this regard, the amount of the melted metal 5a supplied to the welding end point E is less than the amount of the melted metal needed to fill the sink 6, and therefore when the melted metal 5a is cooled and solidifies while shrinking sequentially from the outer part thereof, the sink 6 is formed (a through-hole is formed in some cases) in the central portion of the laser-irradiated portion of the workpieces 1 and 2.

In attempting to solve this problem, a published unexamined Japanese patent application No. 2007-313544 discloses a welding method in which the laser power is gradually decreased as the laser head is driven to the welding end point E instead of stopping the laser irradiation processing at once at the welding end point E. By using this method (i.e., by gradually decreasing the laser power as the laser head approaches the welding end point E near which a welding bead 5 is present), the depth (thickness) of the melted portion gradually decreases in the scanning direction X, and therefore the frequency of formation of a hole at the welding end point E decreases.

Although the frequency of formation of a hole at the welding end point E decreases in the above-mentioned conventional laser lap welding method, the method causes a problem in which when the melted metal 5a is cooled, a long and thin welding bead 5 solidifying and extending in the scanning direction X is formed as illustrated in FIG. 9A, and in addition a relatively deep sink 6 is formed on the surface of the workpiece 1 at the welding end point E. In this regard, since the sink 6 has a crack (internal crack) r in the vicinity of the gap d, which crack is caused by solidification crack, the joint strength of the workpieces 1 and 2 decreases.

For these reasons, we recognize that there is a need for a laser lap welding method which includes scanning one side surface of overlapped plural workpieces with a laser beam in a scanning range of from a welding start point of the one side surface of the plural workpieces to a welding end point thereof to weld the plural workpieces and by which the workpieces can be joined with a high strength while preventing formation of solidification crack which is typically formed at the welding end point.

SUMMARY

As an aspect of the present invention, a laser lap welding method is provided which includes performing linear laser scanning on one side surface of overlapped plural workpieces by scanning a linear scanning range of from a welding start point of the one side surface to a welding end point thereof with a laser beam to weld the plural workpieces. In this method, when the laser beam reaches a laser power control point in the scanning range a predetermined time before the laser beam reaches the welding end point, the power of the laser beam is controlled to gradually decrease until the laser beam reaches the welding end point. In addition, after the laser beam reaches the welding end point, circular laser scanning using the laser beam is performed around an axis extending in the depth direction of the workpieces through the welding end point using the laser beam to circularly melt and fluidize a portion of the workpieces around the welding end point.

BRIEF DESCRIPTION OF THE SEVERAL VIEWS OF THE DRAWINGS

FIGS. 6A to 6D are schematic views illustrating each stage in formation of a solidification crack at the welding end point;

DETAILED DESCRIPTION

Figure 1:
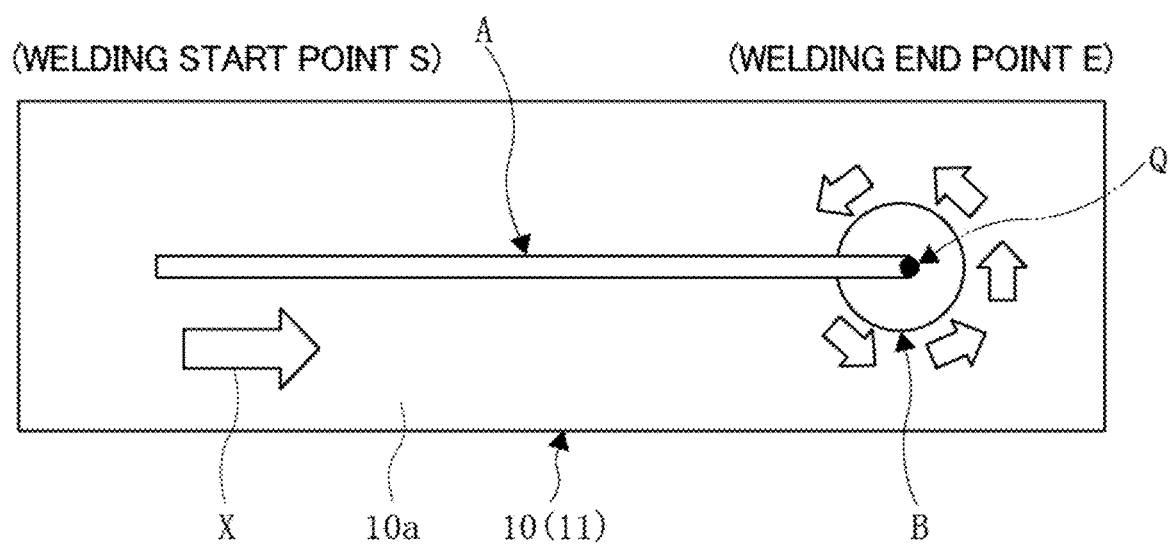
FIG. 1 is a schematic view illustrating the process of a welding processing in a range of from a welding start point to a welding end point in a laser lap welding method according to the present invention.

The purpose of the present invention is to provide a laser lap welding method which includes scanning one side surface of overlapped plural workpieces with a laser beam in a scanning range of from a welding start point of the one side surface of the plural workpieces to a welding end point thereof to weld the plural workpieces and by which the workpieces can be joined with a high strength while preventing formation of solidification crack which is typically formed at the welding end point.

In order to attain the purpose, the present inventors have diligently researched. As a result of the research, the present inventors clarify the mechanism of formation of a solidification crack formed at a welding end point when irradiating a side surface of overlapped plural workpieces with a laser beam to weld the workpieces. The mechanism of formation of a solidification crack is illustrated in FIGS. 6A-6D. Specifically, when laser lap welding is completed by stopping laser irradiation to the side surface 3 at a welding end point as illustrated in FIG. 6A, the melted metal 5a forming the welding bead 5 is cooled and solidifies while shrinking sequentially from the outer part thereof, resulting in generation of a tensile stress P as illustrated in FIG. 6B. Since the tensile stress P is formed, the sink 6 which has a long and thin shape in planar view along the laser scanning direction X is formed at the central portion of the welding bead 5 as illustrated in FIG. 6C. In this regard, as solidification of the melted metal 5a proceeds linearly, the tensile stress P increases, and the central portion of the melted metal 5a is thinned (recessed). Thus, the shape of the sink 6 is changed from a shallow groove shape to a deep V groove shape as illustrated in FIG. 6D. Since the tensile stress concentrates on the sink 6 having the deep V groove shape, a long crack r is formed in the sink 6 along the scanning direction X, resulting in formation of the solidification crack.

On the basis of the thus clarified mechanism, the present inventors obtain the following knowledge. Specifically, in the laser lap welding method of the present invention, when the scanned laser beam reaches the welding end point, the laser beam is not stopped and is used for circular scanning for a certain time around an axis Q (illustrated in FIG. 1) extending in the thickness direction of the workpieces through the welding end point so that the melted metal is mixed circularly to uniformize the tensile stress formed when the melted metal starts to solidify. In this case, occurrence of the problem in which the melted metal linearly solidifies in the laser scanning direction and the tensile stress concentrates on a sink having a shallow groove shape can be prevented, thereby making it possible to prevent formation of a solidification crack (i.e., formation of a crack in a sink having a deep V groove shape). Namely, by studying the phenomenon of a solidification crack caused by the tensile stress generating when a melted metal solidifies, the problem of the conventional laser lap welding method can be solved. Thus, the present invention can be made.

Specifically, the laser lap wielding method of the present invention includes performing linear laser scanning on one side surface of overlapped plural workpieces by scanning a linear scanning range of from a welding start point of the one side surface to a welding end point thereof with a laser beam to weld the plural workpieces. The laser lap welding method is characterized in that when the laser reaches a laser power control point in the linear scanning range a predetermined time before reaching the welding end point, the power of the laser beam is controlled to gradually decrease until the laser beam reaches the welding end point; and when the laser beam reaches the welding end point, circular laser scanning is performed using the laser beam around an axis extending in the depth direction of the workpieces through the welding end point to circularly melt and fluidize a portion of the workpieces around the welding end point.

In the laser lap welding method mentioned above, it is preferable that when the laser beam reaches the laser power control point, the laser scanning speed is gradually increased until the laser beam reaches the welding end point.

Further, in the laser lap welding method mentioned above, it is preferable that the circular scanning using the laser beam around the axis is performed at a speed lower than the speed of the linear scanning of the laser beam just before the laser beam reaches the welding end point and by a power of the laser beam lower than the power of the laser beam just before the laser beam reaches the welding end point.

Next, an embodiment of the laser lap welding method of the present invention will be described in detail by reference to FIGS. 1 to 6. In this regard, the element having substantially the same function and constitution as that used for the above-mentioned conventional laser lap welding method has the same reference number to avoid overlap in description.

As illustrated in FIG. 1, the laser lap welding method of the present invention includes linearly scanning one side surface 10a of overlapped workpieces 10 and 11 in a scanning direction X with a laser beam in a linear scanning range of from a welding start point S to a welding end point E to irradiate the one side surface with the laser beam and to weld the overlapped workpieces. In FIG. 1, character A represents a linear laser scanning process. When the laser beam reaches a laser power control point in the linear scanning range on the one side surface before reaching the welding end point E, the power of the laser beam is controlled to gradually decrease as the laser beam approaches the welding end point E. In addition, when the laser beam reaches the welding end point, circular scanning is performed using the laser beam around an axis Q extending in the depth direction of the workpieces through the welding end point to circularly melt and fluidize the workpieces around the welding end point E. In FIG. 1, character B represents a circular laser scanning process.

In this embodiments, the workpiece is the overlapped two plates 10 and 11. However, the workpiece is not limited thereto as long as two or more pieces each having a tabular portion are overlapped to form a welding portion. For example, combinations of a plate and another piece which has a shape other than the plate shape but has a tabular portion to be overlapped on the plate, and combinations of pieces each of which has a shape other than the plate shape but has a tabular portion to be overlapped on each other can be used as the workpiece. As mentioned above, the number of overlapped workpieces is not limited to two, and three or more overlapped workpieces can be used for the laser lap welding method.

Figure 2:
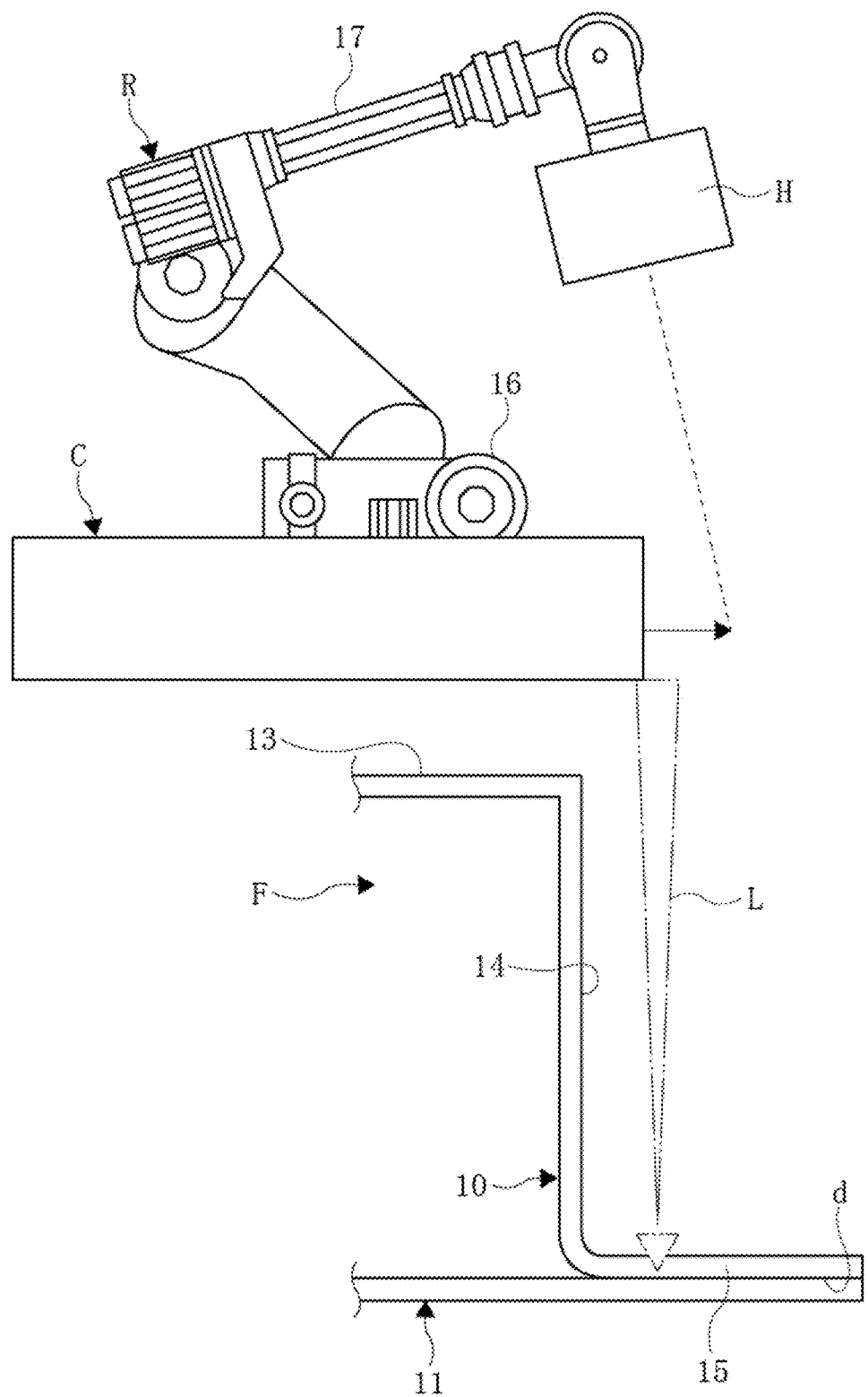
FIG. 2 is a schematic side view illustrating a laser welding apparatus for use in the laser lap welding method.
Figure 3:
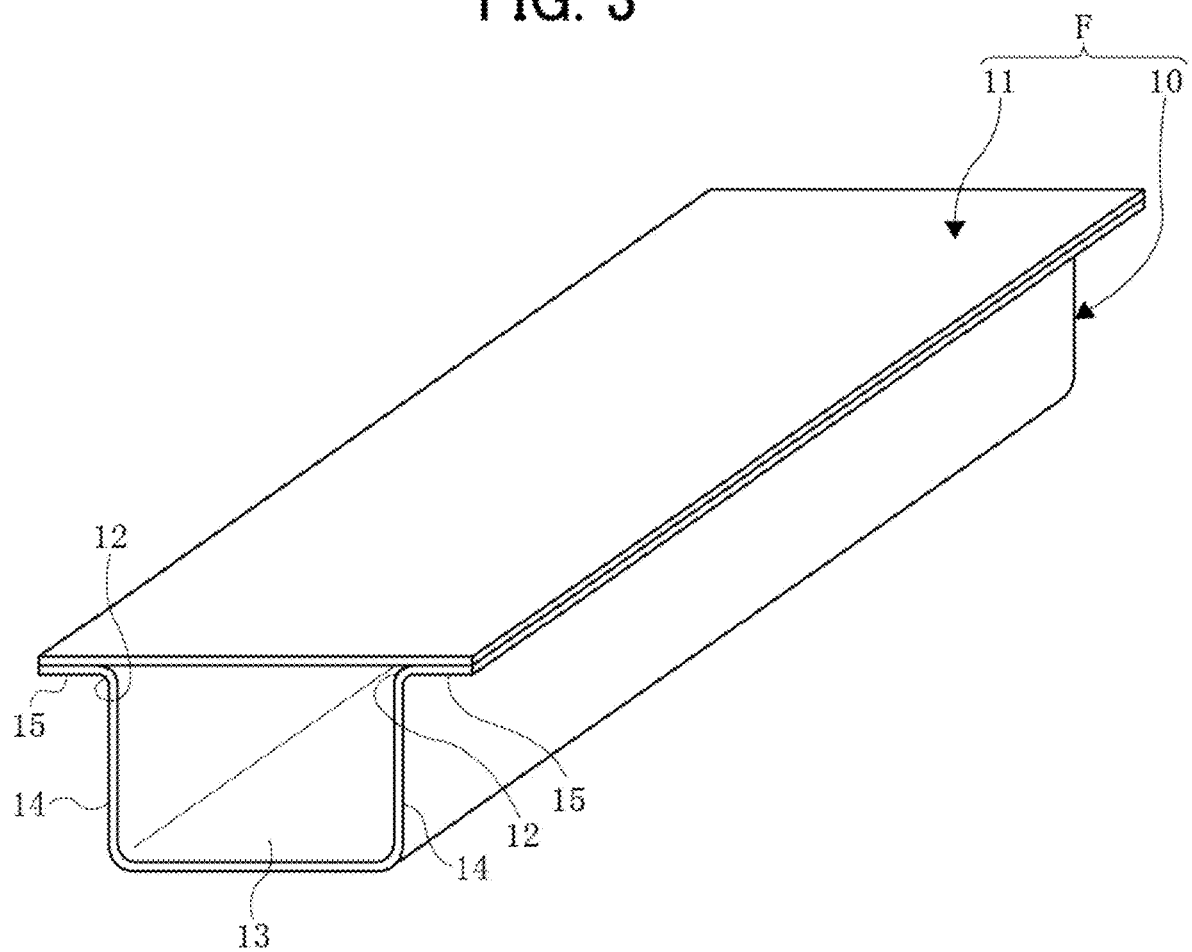
FIG. 3 is a schematic perspective view illustrating an automotive steel frame prepared by the laser lap welding method.
Figure 4A:
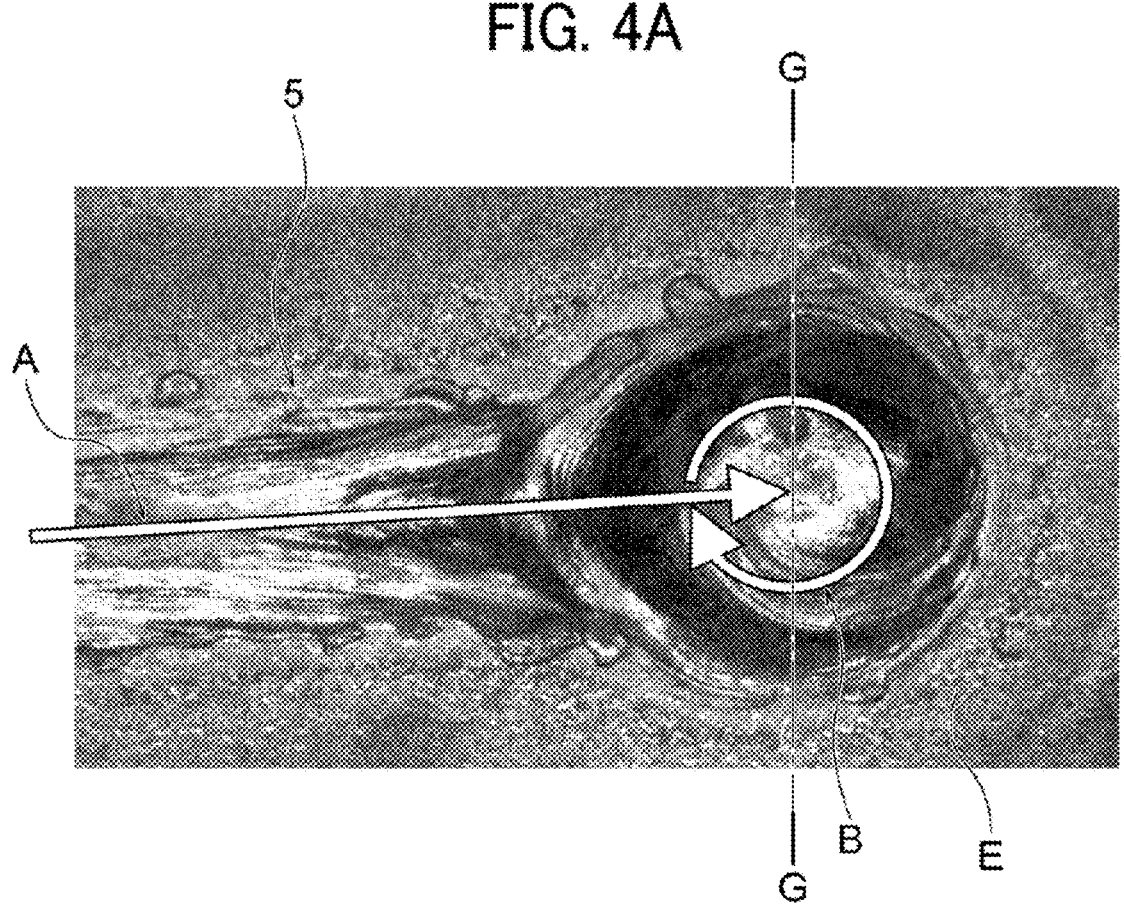
FIG. 4A is a micrograph illustrating the planar shape of a welding bead and a sink formed at the welding end point.
Figure 4B:
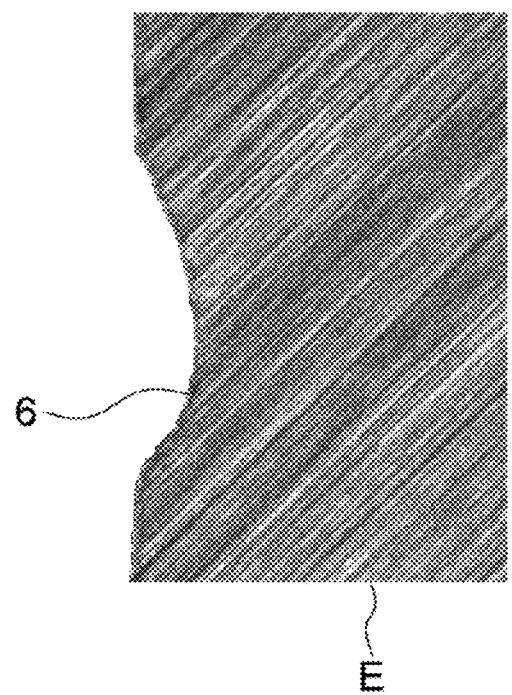
FIG. 4B is a micrograph illustrating the cross-section of the sink along a line G-G.

In this embodiment, such a laser welding apparatus as illustrated in FIG. 2 is used for welding workpieces which are illustrated in FIG. 3 and which include a frame part 10 having a hat-form cross-section and a panel part 11 to prepare, for example, a steel frame F for use in automobile bodies. The laser welding apparatus includes a controller C, and a welding head H used for the welding process which is performed according to welding positioning data obtained by preliminarily correcting the welding position gap between the overlapped workpieces.

The steel frame F is made of a thin steel plate and is prepared, as illustrated in FIG. 2, by welding the panel part 11 and the frame part 10 which is made by press molding and which has a hat-form cross-section and includes a frame main body 13, webs (i.e., vertical walls) 14 of the frame main body 13, and a flange 15 extending from both ends of the webs 14 while curved. In this regard, welding is performed on an overlapped portion of the workpieces 11 and 12 near an R tangent/tangent end 12.

In this embodiment, the steel plate used for the overlapped workpieces 10 and 11 has a thickness of from 0.6 mm to 3 mm, and the power of the laser beam L is set to fall in a range of from 2 kW to 6 kW. The welding scanning speed of the laser welding head H is determined depending on the thickness of the workpieces 10 and 11 and other factors. For example, when the power of the laser beam L is 2 kW, the diameter of spot of the laser beam L at the welding start point S is 0.6 mm, and the thickness of each of the workpieces 10 and 11 is 0.7 mm, the welding scanning speed is set to 2 m/min.

The laser welding apparatus includes a welding robot R and the controller C to control the welding robot R. The welding robot R performs welding by using a remote laser welding method in which the laser beam L is emitted by the laser welding head H from a position separated from the welding position (i.e., the welding torch is separated from the welding position). In FIG. 2, numerals 16 and 17 denote a support of the welding robot R and a robot arm, respectively.

The controller C electrically controls the entirety of the laser welding apparatus, and is electrically connected with a welding jig which sets the workpieces to a predetermined setting position while holding the workpieces. In addition, the controller C subjects a servomotor to drive control via a robot controller to operate the laser welding head H while controlling a laser oscillator serving as a light source to emit linear laser from a laser irradiator for performing laser lap welding.

Next, the method for preparing the steel frame F by performing laser lap welding on the overlapped workpieces including the frame part 10 having a hat-form cross section and the panel part 11, which is set on the flanges 15 of the frame part 10, at welding positions near the R tangent/tangent ends 12 of the flanges 15 will be described by reference to FIGS. 1-5.

(1) First Pass (Linear Scanning Process A)

Figure 5:
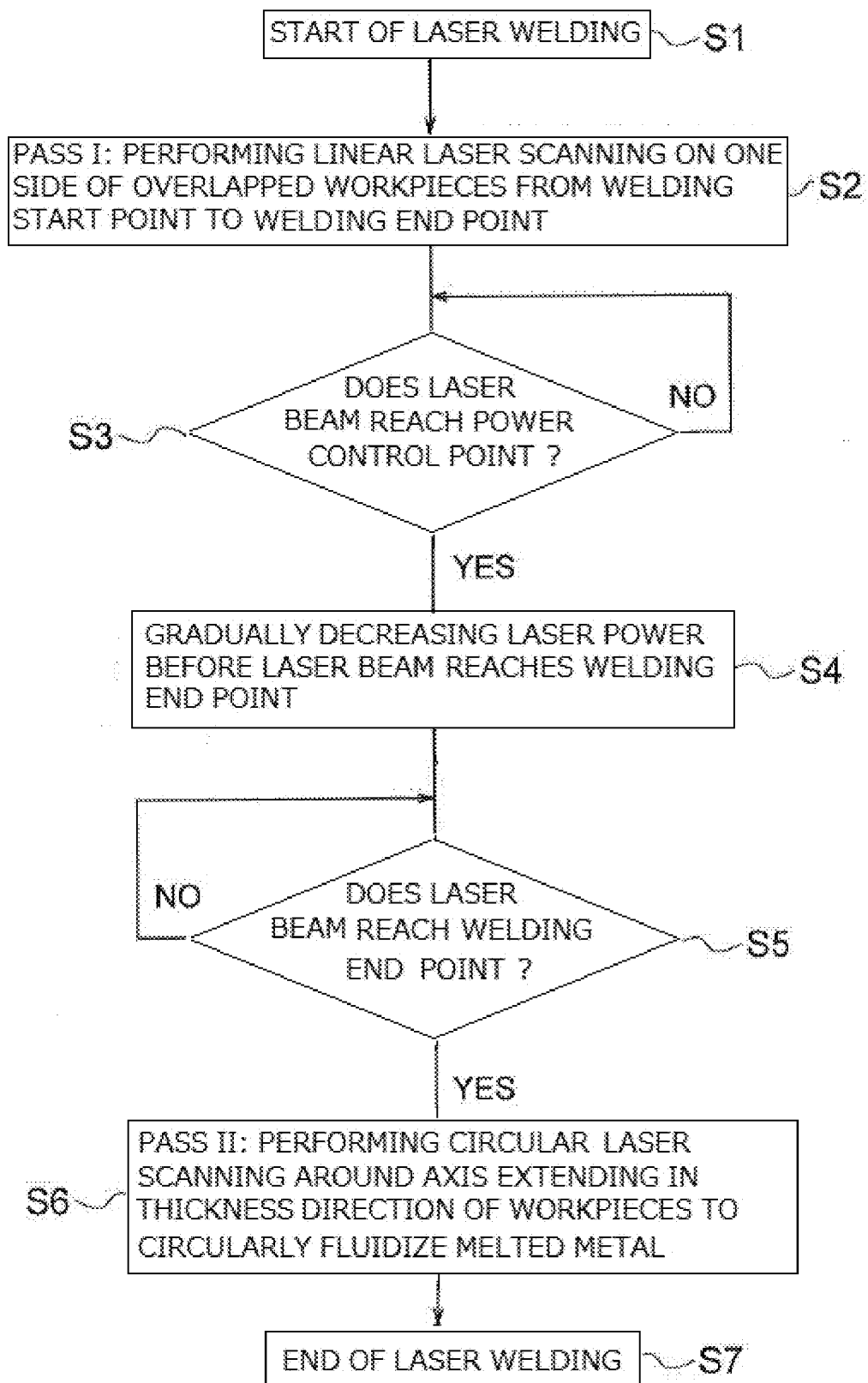
FIG. 5 is a flowchart illustrating the welding process of from a welding starting step to a welding ending step in the laser lap welding method.
Figure 7:
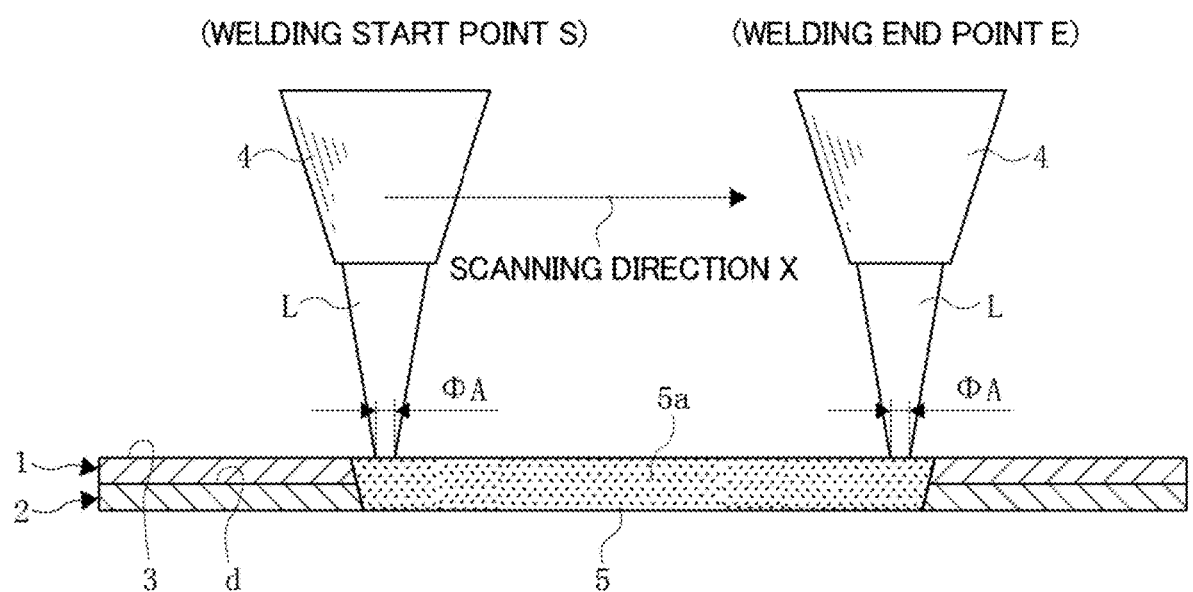
FIG. 7 is a schematic view illustrating the process of a conventional laser lap welding method.
Figure 8:
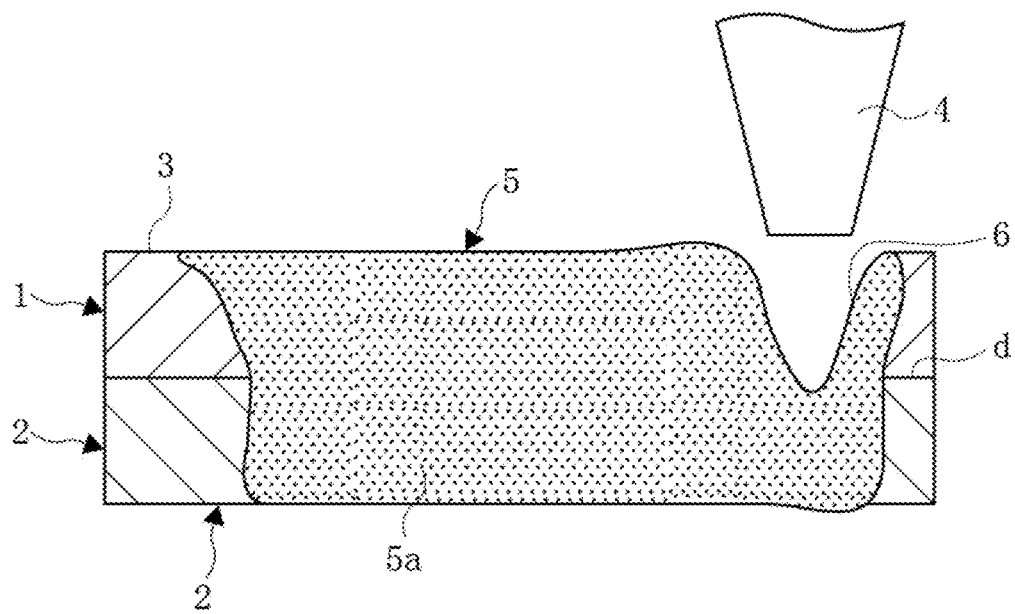
FIG. 8 is a schematic view illustrating a sink formed by the conventional laser lap welding method at a welding end point.
Figure 9A:
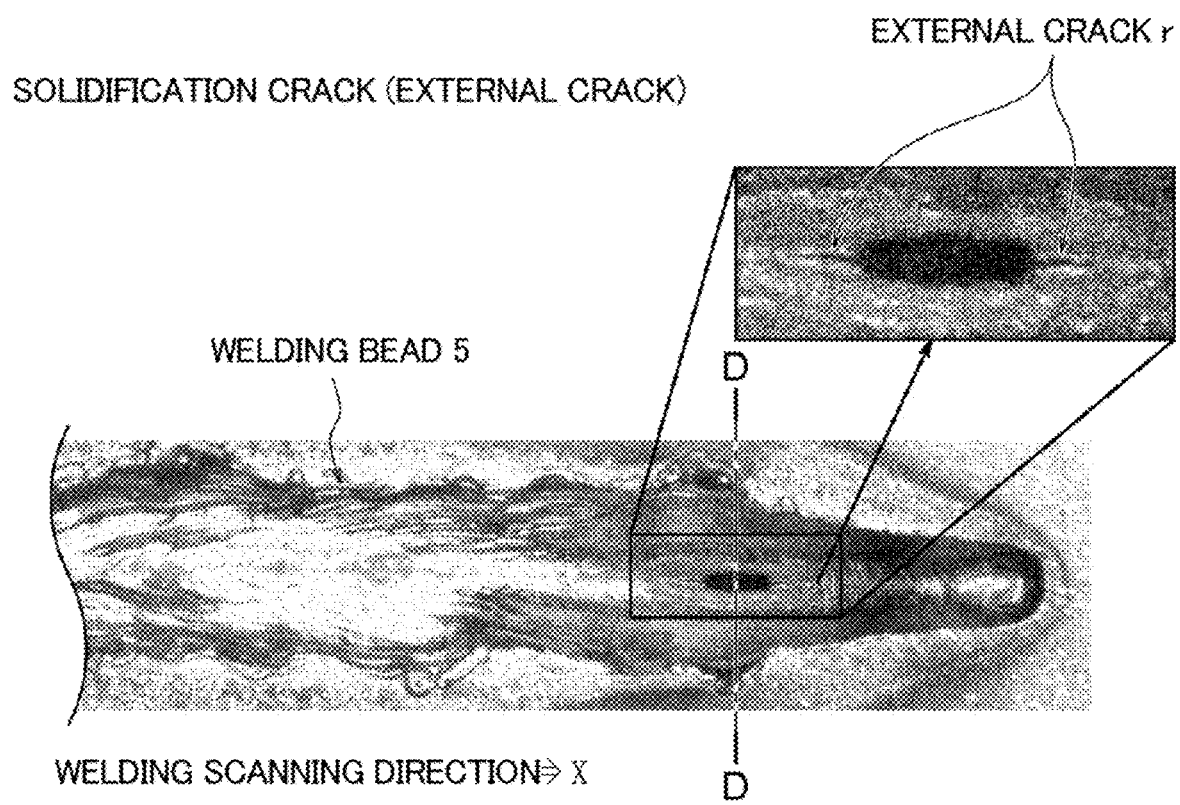
FIG. 9A is a micrograph illustrating the planar shape of a solidification crack formed at the welding end point by the conventional laser lap welding method.
Figure 9B:
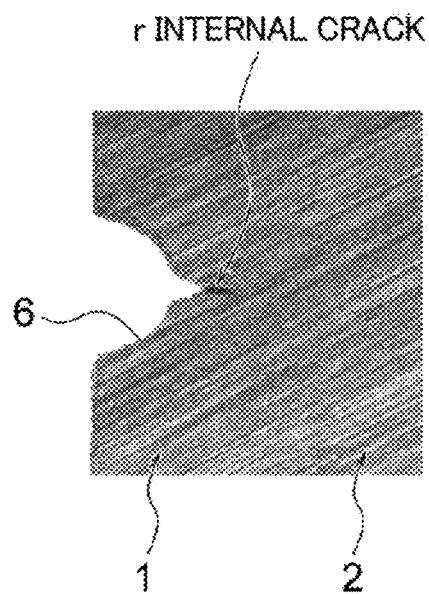
FIG. 9B is a micrograph illustrating the cross-section of the solidification crack along a line D-D.

Initially, a combination workpiece in which the panel part 11 is overlapped on the flanges 15 of the frame part 10 having a hat-form cross-section is set on the predetermined setting position of the welding jig while positioned, and then the side surface 10a of the frame part 10 is scanned with the laser beam L to be irradiated from above (step S1 in FIG. 5). Thus, laser welding is started. In this regard, scanning using the laser beam L is linear laser scanning in a predetermined linear scanning region of from the welding start point S to the welding end point and is performed at a constant scanning speed and by a constant laser power (step S2).

When a predetermined time passes after the laser scanning is started, the controller C checks whether the laser beam reaches a predetermined laser power control point which is located before the welding end point E (step S3). In this regard, the laser power control point is preliminarily determined properly, and is, for example, a point which is located before the welding end point E and which is apart from the welding end point E by such a distance that it takes a predetermined time (e.g., 0.1 seconds) when the laser beam scanning is performed at the predetermined scanning speed. When the laser beam reaches the laser power control point, the controller C controls the laser power to gradually decrease as the laser beam proceeds toward the welding end point E (step S4). For example, the diameter (irradiation diameter) of the laser beam is controlled so that the diameter of the laser beam at the welding end point E is greater than the diameter at the laser power control point to decrease the laser power (i.e., energy density of laser) as the laser beam proceeds toward the welding end point E from the laser power control point. In this regard, the depth of the melted portion of the workpiece gradually decreases from the laser power control point, thereby making it possible to decrease the frequency of formation of a through hole at the welding end point E. Therefore, the joint strength of the overlapped workpieces 10 and 11 can be enhanced.

In addition, after the laser beam reaches the laser power control point, it is possible that the scanning speed (linear scanning speed) of the laser beam is gradually increased. In this case, the energy density of the laser beam incident on a portion of the workpiece per a unit time decreases, thereby producing an effect which is similar to the above-mentioned effect produced by decreasing the laser power.

Further, by concurrently using a welding technique such as downslope and fade down in which the laser power is decreased continuously or step-by-step, welding beads having a more preferable shape can be formed.

(2) Second Pass (Circular Scanning Process B)

In this laser lap welding method, when the laser beam reaches the welding end point E at the end of the linear scanning process A (YES in step S5), the controller C does not stop the laser irradiation and circular scanning using the laser beam is performed for a predetermined time (e.g., 0.19 seconds) around the axis Q extending in the depth direction of the workpieces through the welding end point E as illustrated in FIG. 1 to circularly fluidize the melted metal portion of the workpieces (step S6), resulting in end of the laser welding operation (step S7).

In this laser lap welding method, when the laser beam reaches the welding end point E after the linear scanning process A, the laser irradiation is not stopped and circular scanning using the laser beam is performed for a predetermined time around the axis Q extending in the depth direction of the workpieces through the welding end point E to circularly fluidize the melted metal portion of the workpieces. Therefore, even when the melted metal portion is cooled and starts to solidify, the metal portion is fluidized and mixed by the circular scanning using the laser beam around the axis Q extending in the depth direction of the workpieces, thereby uniformizing the tensile stress generating when the melted metal solidifies. Therefore, occurrence of the problem in which the melted metal linearly solidifies in the laser scanning direction and the tensile stress concentrates on a sink can be prevented, thereby making it possible to effectively prevent formation of a solidification crack caused by formation of a sink having a deep V groove shape at the welding end point E.

It is preferable in the circular scanning process B that the circular scanning is performed at a speed lower than the linear laser scanning speed in the linear scanning process A before the laser beam reaches the welding end point E and by a laser power lower than the laser power before the laser beam reaches the welding end point E in the linear scanning process A. In this case, the energy density per a unit time of the laser beam in the circular scanning process B is higher than the energy density of the laser beam in the linear scanning process A. Therefore, the melted metal portion around the welding end point E is circularly fluidized more effectively, thereby making it possible to prevent formation of a solidification crack caused by formation of a sink having a deep V groove shape at the welding end point E.

In FIG. 1, the direction of the circular laser scanning process B is counterclockwise. However, the direction of the circular laser scanning process B is not limited thereto (i.e., the scanning direction can be clockwise) as long as the melted metal portion can be fluidized by the circular laser scanning.

EFFECT OF THE PRESENT INVENTION

In the laser lap welding method of the present invention, welding is performed by controlling the laser power to gradually decrease until the laser beam reaches the welding end point after the laser beam reaches the laser power control point. Therefore, the depth of the melted portion gradually decreases in the scanning direction, and the frequency of formation of a through hole at the welding end point can be decreased, thereby making it possible to enhance the joint strength of the overlapped workpieces. In addition, when the laser beam reaches the welding end point after the linear scanning process, the laser irradiation is not stopped and circular laser scanning using the laser beam is performed for a predetermined time around the axis extending in the depth direction of the workpieces through the welding end point to circularly fluidize the melted metal portion of the workpieces. Therefore, when the melted metal portion is cooled and starts to solidify, the metal portion is fluidized and mixed by circular scanning using the laser beam around the axis extending in the depth direction of the workpieces, thereby uniformizing the tensile stress generating when the melted metal solidifies. Therefore, occurrence of the problem in which the melted metal linearly solidifies in the laser scanning direction and the tensile stress concentrates on a sink can be prevented, thereby making it possible to effectively prevent formation of a solidification crack caused by formation of a sink having a deep V groove shape at the welding end point.

In the laser lap welding method of the present invention, after the laser beam reaches the laser power control point, it is preferable that the scanning speed of the linear scanning process is gradually increased from the laser power control point. In this case, the energy density of the laser beam used for irradiating a portion of the workpiece per a unit time decreases, thereby producing an effect which is similar to the effect produced by decreasing the laser power. Namely, welding is performed by controlling the laser energy density to gradually decrease as the laser beam approaches the welding end point after the laser beam reaches the laser power control point. Therefore, the depth of the melted portion gradually decreases in the scanning direction, and the frequency of formation of a through hole at the welding end point can be decreased, thereby making it possible to enhance the joint strength of the workpieces.

Further, in the laser lap welding method of the present invention, it is preferable in the circular scanning process that the circular scanning is performed at a speed lower than the linear laser scanning speed in the linear scanning process before the laser beam reaches the welding end point and by a laser power lower than the laser power before the laser beam reaches the welding end point in the linear scanning process. In this case, the energy density per a unit time of the laser beam in the circular scanning process is higher than the energy density of the laser beam in the linear scanning process. Therefore, the melted metal portion around the welding end point is circularly fluidized more effectively and the tensile stress formed when the melted metal solidifies is uniformized, thereby preventing occurrence of the problem in which the melted metal linearly solidifies in the laser scanning direction and the tensile stress concentrates on a sink, resulting in prevention of formation of a solidification crack caused by formation of a sink having a deep V groove shape at the welding end point.

What is claimed is:

1. A laser lap welding method comprising:
performing linear laser scanning on one side surface of one workpiece of overlapped plural workpieces by scanning a linear scanning range from a welding start point of the one side surface to a welding end point thereof with a laser beam to weld the plural workpieces;
controlling a power of the laser beam to decrease until the laser beam reaches the welding end point when the laser beam reaches a laser power control point in the linear scanning range a predetermined time before the laser beam reaches the welding end point; and
performing circular laser scanning using the laser beam around an axis extending in a depth direction of the plural workpieces through the welding end point after the laser beam reaches the welding end point to circularly melt and fluidize a portion of the plural workpieces around the welding end point,
wherein the circular laser scanning is performed at a scanning speed lower than a scanning speed of the linear laser scanning and by a laser power lower than a power of the laser beam just before the laser beam reaches the welding end point in the linear laser scanning, and
wherein an irradiation of the laser beam is not stopped between the linear laser scanning and the circular laser scanning.

2. The laser lap welding method according to claim 1, further comprising increasing a scanning speed of the linear laser scanning after the laser beam reaches the laser power control point until the laser beam reaches the welding end point to decrease an energy density of the laser beam incident on a portion of the one workpiece per unit time.

3. The laser lap welding method according to claim 1, wherein the controlling the power of the laser beam is performed to decrease the power of the laser beam continuously or step-by-step until the laser beam reaches the welding end point when the laser beam reaches the laser power control point in the linear scanning range the predetermined time before the laser beam reaches the welding end point.

* * * * *